July 16, 1963  J. J. GILVARRY ETAL  3,097,717
AUTOMATIC SELF-STEERING AUXILIARY FOR PARKING PURPOSES
Filed Nov. 21, 1955  3 Sheets-Sheet 1
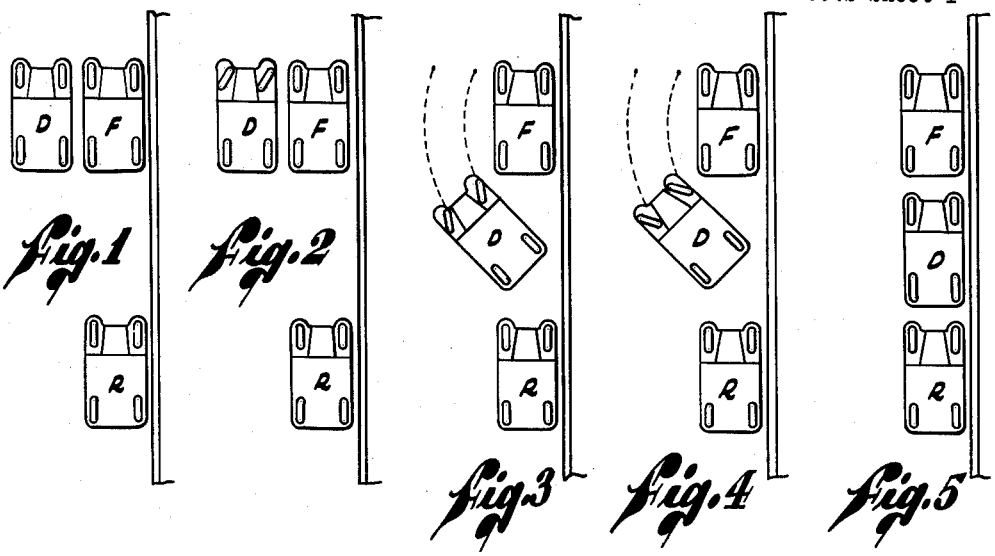
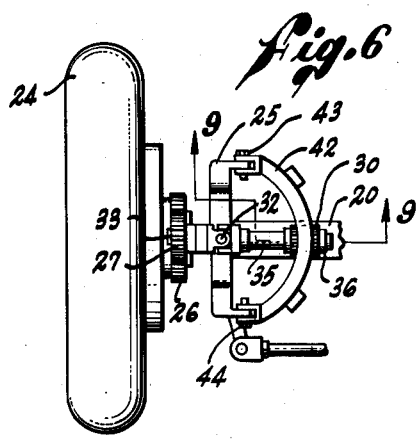
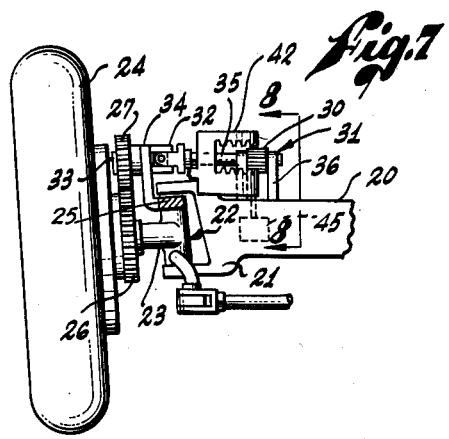
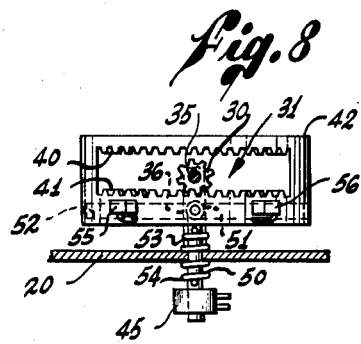
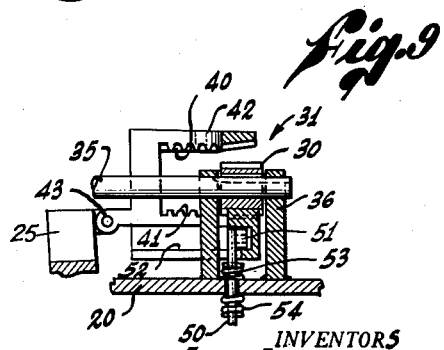
INVENTORS
JOHN J. GILVARRY
LINN A. GORE
BRUNO W. AUGENSTEIN
WILLIAM C. RANDELS
By Fulwider Mattingly & Huntley
ATTORNEYS

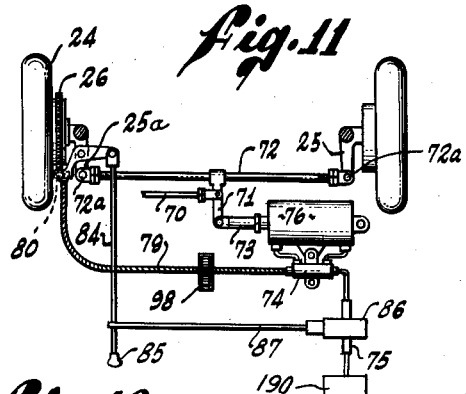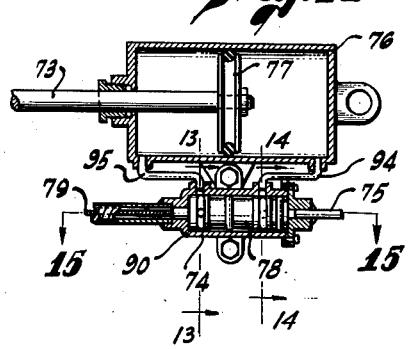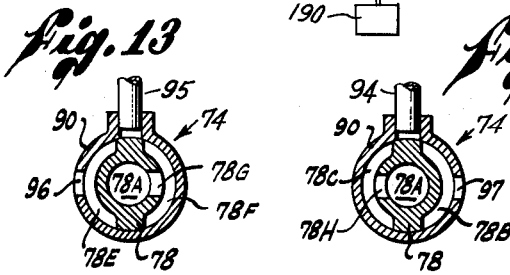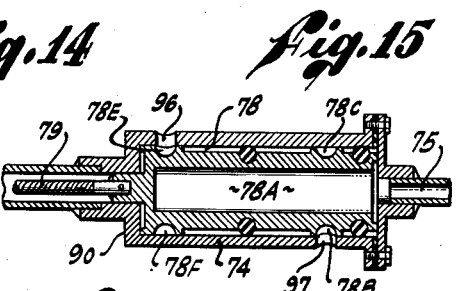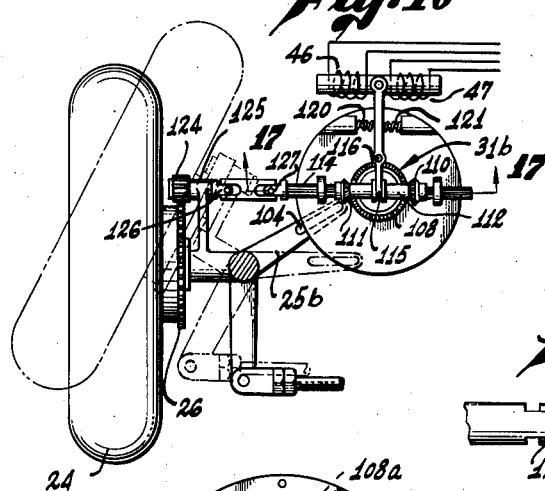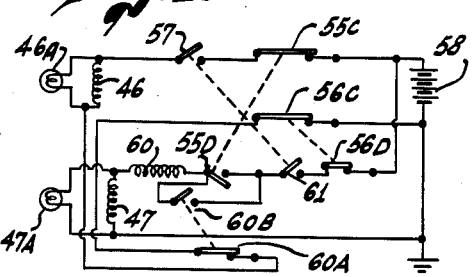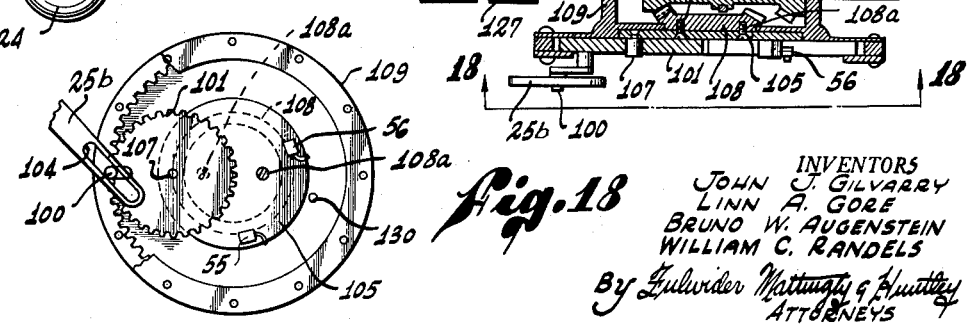

July 16, 1963 J. J. GILVARRY ETAL 3,097,717
AUTOMATIC SELF-STEERING AUXILIARY FOR PARKING PURPOSES
Filed Nov. 21, 1955 3 Sheets-Sheet 3

INVENTORS
JOHN J. GILVARRY
LINN A. GORE
BRUNO W. AUGENSTEIN
WILLIAM C. RANDELS
BY Fulwider Mattingly & Huntley
ATTORNEYS

United States Patent Office 3,097,717
Patented July 16, 1963

3,097,717
AUTOMATIC SELF-STEERING AUXILIARY FOR PARKING PURPOSES
John J. Gilvarry, Los Angeles, Linn A. Gore, Santa Monica, Bruno W. Augenstein, Woodland Hills, and William C. Randels, Studio City, Calif., assignors, by direct and mesne assignments, to General Motors Corporation, Detroit, Mich., a corporation of Delaware
Filed Nov. 21, 1955, Ser. No. 547,907
6 Claims. (Cl. 180—1)

Our invention relates generally to the parking of automotive vehicles, and more particularly to devices adapted to aid and facilities the parking of such a vehicle in the shortest possible space, and with the least possible movement of the steering wheels.

This application is a continuation-in-part of our copending application entitled "Parking Device," Serial No. 255,576, filed November 9, 1951, now Patent Number 2,736,015, issued February 21, 1956, which in turn is a continuation-in-part of our prior application Serial No. 182,476, filed August 31, 1950, and entitled, "Parking Device," and which has since been abandoned.

The problem of parking an automobile adjacent the curb, and between two parked cars, particularly where so-called "parallel" parking is required, has always presented certain problems for the driver. Particularly in the case of the somewhat inexperienced operator, parallel parking has been quite difficult, and the problem has often assumed such proportions in the minds of these drivers that great efforts have been used to avoid the need for parallel parking. Actually, the problem is not difficult, but judgment and experience play very important parts in parking an automobile in the least possible space, with the fewest possible movements. Most drivers have known that by pulling abreast of the car parked ahead of the parking space, turning the steering wheel to the right, backing, and then turning the steering wheel to the left when a predetermined position with respect to the forward car is reached, parking can quickly and easily be accomplished. The exact position for these various maneuvers, however, can only be determined by practice and experience, and many drivers never become adapt at this type of parking.

It is possible to establish a sequence of operations, such as those just described, that will permit the car to be parked in the least possible space. The sequence may be started at any desired point in the normal parking operations, and the movement of the car itself may be used to indicate when the various operations should be performed. In fact, it is possible to use this movement to perform these operations, so that the power of the engine is used to steer the car in a manner to follow a predetermined path.

While parking devices have previously been known, these in general have relied upon auxiliary means, such as wheels, that may be lowered from the car to engage the ground or street, and then to move the car in a direction generally perpendicular to its normal line of travel. Such devices, while theoretrically practical, introduce many mechanical complications, and satisfactory devices of this type have been too expenisve to be included in popularly priced cars. These same problems, and generally even greater complications, arise if an attempt is made to include these devices in existing automobiles.

It is therefore a major object of our invention to provide a parking device that enables an automobile or similar vehicle to be parked in the shortest possible distance, and with the fewest possible movements.

It is another object of our invention to provide a parking device of this type that may be incorporated as a standard part and equipment of an automobile when built, or may equally well be installed upon existing automobiles.

A further object of our invention is to provide a parking device that, in one form, will provide signals indicating when an operation is to be manually performed, and in other forms provides an indication and also performs the operation by means of some suitable type of servomechanism powered by the engine of the car.

Still another object of our invention is to provide a parking device of this character that is very simply operated and requires the minimum of judgment and experience on the part of the operator, so that even a novice may quickly and easily park an automobile.

It is a still further object of our invention to provide such a parking device that, while being rugged, is simple and inexpensive to manufacture and install, while having great dependability.

These and other objects and advantages of our invention will become apparent from the following description of various forms thereof and from the drawings illustrating those forms, in which:

FIGURES 1 through 5 are a series of schematic diagrams illustrating the steps in parking an automobile such as might be followed when using one of the forms of our device;

FIGURE 6 is a top plan view of a ground-engaging steerable wheel, hereinafter referred to as a "dirigible wheel," of an automobile showing one species of a power-operated parking device operatively connected thereto, the particular dirigible wheel shown being the left front wheel of a vehicle;

FIGURE 7 is a rear elevational view of the dirigible wheel and associated mechanism shown in FIGURE 6;

FIGURE 8 is an elevational view taken on the line 8—8 of FIGURE 7, showing the power connection for turning the dirigible wheel;

FIGURE 9 is a view on an enlarged scale, taken on the line 9—9 of FIGURE 6 and showing some of the parts in section;

FIGURE 10 is a schematic wiring diagram of the control circuit used to operate the various elements associated with the first species of the power-operated devices;

Figure 19:
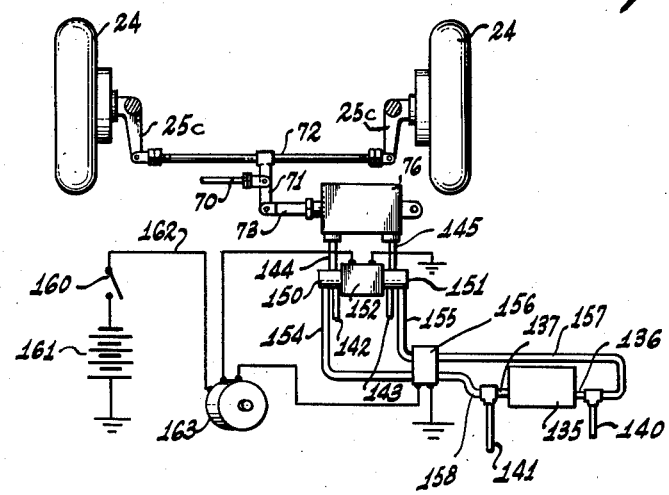
Figure 20:
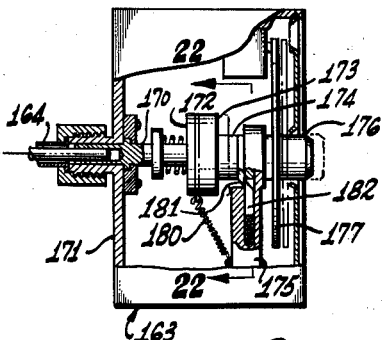
Figure 21:
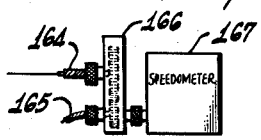
Figure 22:
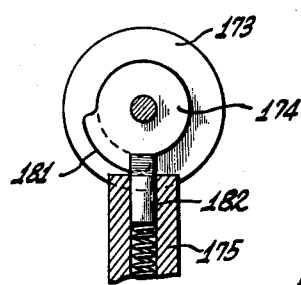

FIGURES 11 through 15, inclusive, illustrate a hydraulically or pneumatically powered mechanism that constitutes a second power-operated species of our device, FIGURE 11 being a top plan view of a schematic representation of the complete system, FIGURE 12 showing the power operating cylinder and valve in section, and FIGURES 13, 14, and 15 being sectional views taken on lines 13—13, 14—14, and 15—15 of FIGURE 12;

FIGURES 16, 17, and 18, inclusive, illustrate a third species of power-operated forms of our parking device, this third species being a mechanically operated form shown generally in plan view in FIGURE 16, while FIGURE 17 is a sectional view taken on the line 17—17 of FIGURE 16, and FIGURE 18 is a bottom plan view taken on the line 18—18 of FIGURE 17;

FIGURE 19 is a schematic view of another form of our parking device as it may be applied to an automobile having power steering;

FIGURE 20 is a cross sectional view of the sequence control device used in the operation of the system shown in FIGURE 19;

FIGURE 21 is a front elevational view of the sequence control device with the cover plate removed; and FIGURE 22 is a sectional view taken on the line 22—22 of FIGURE 20 and showing the automatic clutch releasing means.

Referring now to the drawings, and particularly to FIGURES 1 through 5 thereof, we have illustrated one sequence of operations that may be used in the parallel parking of an automobile. In this sequence, the driver of a car D locates a parking space between a parked car F and a second parked car R in the front and rear of that space, respectively. The space, it is assumed, is of sufficient length to receive the car D, with sufficient additional length to provide the necessary maneuvering space required in any parallel parking operation. In this particular parking sequence, the driver of the car D moves his car forward, so that it is parallel to, and generally but not necessarily aligned with the forward parked car F. At the completion of this step, the car D is in the position indicated in FIGURE 1.

At that time, the driver of the car D then turns his wheels to the extreme right, as illustrated in FIGURE 2, and places the car in reverse and backs to the position indicated in FIGURE 3. This second step likewise requires a certain predetermined movement of the car D. This extreme right position of the dirigible wheels is also hereinafter referred to as the "inward" position, since the car is then moved into the parking space.

At the end of step two, the driver of car D turns his wheels from their extreme right position, to their extreme left position, sometimes hereinafter referred to as the "outward" position, as illustrated in FIGURE 4, and then continues in reverse until substantially parallel to the curb and within the parking space, as illustrated in FIGURE 5. Thus, at the end of this third step, the parking operation is substantially completed, and only slight additional maneuvering may be necessary.

To secure the maximum benefit from our parking device, the wheels must be turned sharply when the car is at a predetermined position, and it is generally recognized that it is much more difficult to turn the wheels when the car is stationary then when it is moving. While the car can be moved while the turning operation is being performed, unless the movement of the car and the turning of the wheels are done at a standardized rate, the parking operation will not be uniform. Thus, to reduce the physical effort required in parking, and also to insure a standard, uniform procedure, a power-operated parking apparatus is to be preferred.

The actual turning of the wheels is accomplished by the engine of the car acting through the movement of the car, or acting through auxiliary power means such as a fluid pump, an air compressor, or other suitable servomechanisms. In this connection, it should be noted that the positions of the dirigible wheels indicated in FIGURES 1 through 5 are not strictly accurate for the various forms of device hereinafter described, except for the hydraulically or pneumatically operated form illustrated in FIGURES 11–15 and 19–22. It will be appreciated, of course, that other forms of quick-operating mechanisms other than fluid motor drives may be used to provide the complete and rapid turning of the dirigible wheels.

In each of the power-operated species shown herein the mechanism may be mounted on the automobile frame member 20 of standard construction which terminates at its ends in a yoke structure 21 that is adapted to support the conventional kingpin bearing structure 22. The kingpin bearing structure 22 supports the wheel axle 23 upon which is rotatably mounted one of the dirigible wheels 24. The wheel axle 23 is rigidly connected to an arm 25 which is used, as hereinafter explained, to move the dirigible wheel 24 to different oriented positions with any one of the three different mechanisms described. It is noted that the element 25 has different shapes in the different structures, but its function in each instance is the same; namely, to impart pivotal movement to the steering wheel from the corresponding mechanisms. Further, each of the first three mechanisms described herein involves the use of a driving gear 26 mounted on the dirigible wheel 24 to rotate with the same.

Referring specifically to the species of our invention illustrated in FIGURES 6 through 10, inclusive, the gear 26 is in constant mesh with a pinion 27 which is coupled to constantly drive a driving gear 30 of a normally disengaged motion reversing clutch 31, through a universal joint 32. Specifically, the pinion 27 is mounted on the shaft 33 which terminates as one part of the universal joint 32, and which is journaled for rotation in an arm 34, the other part of the universal joint being attached to a shaft 35 on which is mounted the driving gear 30. The shaft 35 is journaled for rotation in a bracket 36 which is affixed to the frame member 20.

This gear 30 normally constantly rotates between two arcuate-shaped, rack-type gears 40 and 41 disposed on the inner adjacent faces of an arcuate member 42 which is pivotally mounted by means of hinges 43 and 44 on the arms 25.

Either one of the arcuate-shaped, rack-type gears 40 and 41 may be meshed with the constantly rotating driving gear 30 upon energizing a solenoid means 45 (FIGURES 7 and 8), which includes coils 46 and 47 (FIGURE 10). Such meshing will drive the arcuate member 42 either to the right or left in FIGURE 7, and in turn, correspondingly move the wheel 24 outwardly or inwardly. The movement of the arcuate member 42 into or out of engagement with the driving gear 30 is produced by the solenoid means 45 which has a plunger 50 whose upper end carries a roller 51 adapted to ride in a transversely extending guide groove 52 in the member 42. This plunger 50 is normally held in a mid-position by a pair of prestressed coil compression springs 53 and 54 that thus serve to maintain the driving gear 30 out of engagement with the rack-type gears 40 and 41.

When the coil 46 of the solenoid or electromagnetic means 45 is energized, the gear 30 meshes with the gear 40, and when the other coil 47 is energized, gear 30 engages the gear 41. A circuit for accomplishing this energization is shown in FIGURE 10, where the various switches are in the position they occupy when the wheels 24 are in the straight position, and the manually controlled switches have not been actuated to place the parking device in operation. It will be noted that this circuit includes limit switch assemblies 55 and 56 which are mounted on the arcuate member 42 with corresponding switch actuating members movable into engagement with the roller 51.

Thus, when the dirigible wheel 24 is moved to its inward position, the actuating member of switch assembly 55 is engaged and the associated switches 55C and 55D are actuated. It is noted that switch 55C is normally closed, and switch 55D is normally open, except when the actuating member of switch assembly 55 is engaged. Similarly, upon movement of the wheel 24 to its outward position to engage the actuating member of switch assembly 56, the normally closed switches 56C and 56D are actuated and these switches and the circuits controlled thereby are opened.

The coil 46 is connected in series with a manually operated switch 57, the limit switch 55C, a voltage source 58, the limit switch 56C and a switch 60A. The switch 60A is normally closed and is a portion of a current relay which has an operating coil 60 that, when energized, opens the switch 60A. The other or "out" coil 47 of the solenoid means 45 is connected in series with the winding 60 of the current relay, the limit switch 55D, a manually operated switch 61, the limit switch 56D and the voltage source 58. It will be noted that a normally open switch 60B, which is actuated upon current flow through the winding 60, is in parallel with the switch 55D so that a "holding" circuit for the current relay is established. The manually operated switches 57 and 61 may be ganged for convenience in operation and preferably are located in a conveniently accessible position on the dashboard of the automobile.

The operation of the apparatus shown in FIGURES 6 through 10, inclusive, is quite simple. When the automobile is positioned as shown in FIGURE 1, the manually operated switches 57 and 61 are closed, the driver places his car in conventional reverse gear, lets out the clutch and the mechanism automatically controls the steering of the car. Closure of switch 57 results in energizing the winding 46 to place the gears 30 and 40 in mesh. When and as the car moves backward, the arcuate member 42 attached to the arm 25 causes the wheel axle 23 gradually to pivot. When the car assumes the position shown in FIGURE 3, the switch assembly 55 is actuated to cause the switch 55C to open and the switch 55D to close, thereby de-energizing the coil 46 and causing energization of the coil 47, it being remembered that the manually operated switch 61 is in a closed position.

Such energization of the coil 47 causes gear 30 to mesh with the arcuate-shaped gear 41. Thereafter, continued backward movement of the automobile results in movement of the arcuate member 42 to the left. During such movement to the left, the coil 47 remains energized, since the switch 55D is shunted by the switch 60B which is now closed as a result of current flowing through the winding 60 of the current relay. Thus, during such movement of the member 42 to the left, the front wheels are gradually moved from approximately the position shown in FIGURE 3 corresponding to the "in" position, to the "out" position. When the wheels reach their "out" position, the car is nearly adjacent the curb and the switch assembly 56 is actuated to open the switches 56C and 56D, thereby de-energizing both coils 46 and 47 to allow the driving gear 30 to assume its normal disengaged position. At this stage the driver may open the manually operated switches 57 and 61 and proceed in normal manner to exactly position the car with respect to the curb and with respect to adjacent cars.

If desired, signalling means 46A and 47A (FIGURE 10), such as lights or buzzers, may be connected in paralled with the coils 46 and 47, respectively, to signal the driver. Such signalling means 46A and 47A are here shown as lamp bulbs and may be mounted in some convenient place such as on the dashboard of the car. Thus, the lamp bulb 46A is energized and glows when the coil 46 is energized, thereby signalling to the operator that he is in the first phase or step of the parking operation. When the first phase is completed, the lamp bulb 46A is de-energized and the other lamp bulb 47A is energized and glows to signal to the operator that he is in the second phase of the parking operation. When the second phase has been completed neither the bulb 46A nor the bulb 47A glows, and the operator is thereby informed of the completion of the parking operation. The operator then has a positive indication as to when he should open the manually operated switches 57 and 61 and resume parking maneuvers, if necessary or desirable without the further aid of the new means provided herein.

It is noted that while this mechanism is being operated the steering wheel is turned thereby and the driver is free to use his steering wheel to aid in pivoting the wheel axle 23.

*Description of FIGURES 11 Through 15*

In the arrangement shown in FIGURES 11 through 15, inclusive, pneumatic or fluid means are provided for accomplishing the above indicated results. Steering of the automobile is accomplished in conventional manner by movement of a link 70 attached by suitable means (not shown) to the steering wheel of the automobile. This link is pivotally mounted at an intermediate point on an arm 71, which has one of its ends attached to a synchronizing or tie rod 72 and its other end pivotally connected to a plunger rod 73. Opposite ends of the link 72 are pivoted to the arms 25a at points 72a. Movement of the plunger rod 73 is controlled by a rotary-type valve 74, which serves to control the flow of fluid from a high pressure line 75 into a cylinder 76 in which a double-acting piston 77 is free to move. The line 75 is supplied with high pressure fluid from a pump 190. Within the valve 74 is a rotary control element 78 that is driven by a flexible cable shaft 79 having a small gear 80 at its other end which is movable into engagement with the driving gear 26. This gear 80 is normally out of engagement with the gear 26 but is movable into engagement therewith by movement of a manually operable rod 84. The free end of this rod 84 carries a handle 85 in a conveniently accessible position for the driver of the automobile. Movement of this handle 85 downwardly in FIGURE 11 to cause engagement of the gear 80 with the gear 26 results also in opening a normally closed valve 86 disposed in the high pressure line 75. For this purpose, a link 87 extends between the rod 84 and the valve 86 to control the operation of the latter.

The rotary valve 74 includes a cylindrical housing 90, within which is rotatably mounted a rotary valve body 78. The rotary element 78 has a cylindrical central opening 78A which is constantly in communication with the high pressure duct 75 and is recessed peripherally to provide a pair of annular spaces 78B and 78C (FIGURE 14) adjacent a conduit 94, and similarly is recessed adjacent another conduit 95 (FIGURES 12 and 13) to provide the annular recesses 78E and 78F. It is noted in FIGURES 13 and 14 that the annular spaces 78F and 78C communicate with the central opening 78A through corresponding radial bores 78G and 78H, and the annular spaces 78E and 78B are vented to the atmosphere through openings 96 and 97 in the housing 90.

It is thus apparent from a study of FIGURES 13 and 14, that slight counterclockwise movement of the valve body 78 from its normal position shown in those figures causes the piston 77 to be moved to the right in FIGURE 12. Similarly, slight clockwise movement of the valve body 78 from its normal position results in the piston 77 being moved to the left. This movement of the piston 77, either to the right or left, as the case may be, causes a corresponding outward and inward movement of the dirigible wheels 24. It is noted that the position of the valve element 78 in FIGURES 13 and 14 corresponds substantially to the position of the automobile shown in FIGURES 3 and 4, wherein slight clockwise or counterclockwise movement of the valve body 78 results in orientation of the front wheels as shown in FIGURE 3 or FIGURE 4, as the case may be.

In operation of the arrangement shown in FIGURES 11 through 15, the driver positions his automobile D as shown in FIGURE 1 and then pulls the handle 85 (FIGURE 11) to engage the gears 26 and 80. Such initial movement of the handle 85 results in opening of the valve 86 to introduce high pressure fluid, such as air, into the interior 78A of the valve body 78. At this stage the valve body 78 is in a position wherein such fluid under high pressure acts against the right-hand side of the piston 77 to move the dirigible wheels inwardly to the position shown in FIGURE 2. To assure such initial positioning of the valve body 78, a torque spring 98 acts on the cable 79 to normally bias the valve body 78 to such predetermined position.

After the positioning shown in FIGURE 2 is thus established, the automobile is placed in reverse gear and allowed to travel backwardly along the path indicated in FIGURE 3. When the automobile assumes the position shown in FIGURE 3, the valve body 78 is in the position shown in FIGURES 13 and 14, the valve body being moved during such time by the rotation imparted to cable 79 from the driving gear 26. Further backward movement from the position shown in FIGURE 3 results in reversal of fluid flow to the piston 77, with the result that the front wheels assume the position shown in FIGURE 4. Thereafter, the automobile is allowed to move further backwardly to a position adjacent the curb, the gear 80 is disengaged upon manipulation of the handle 85, which simultaneously causes the valve 86 to close, and then the automobile may be maneuvered to a more favorable parking position, if desired, using the conventional controls.

Description of FIGURES 16 Through 18

The arrangement shown in FIGURES 16, 17, and 18 is similar to the arrangement shown in FIGURES 6 through 10, in that the mechanism is essentially mechanical. In this instance, however, the motion-reversing clutch 31b takes a form different from the clutch 31 of the previously described form and the arm 25b has a different type of motion imparted thereto by a pin 100 on a gear 101 and travelling in a longitudinally extending slot 104 in the arm 25b. The gear 101 is rotatably mounted eccentrically on a plate 105 by a shaft 107, the plate in turn being affixed to a reversible ring gear 108 as by bolts 108a. This ring gear 108 is rotatably mounted for guided movement on a stationary support 109 that is suitably recessed to accommodate the plate 105.

This ring gear 108 may be driven either in a clockwise or counterclockwise direction by engagement with one of a pair of the bevel gears 110 and 111. Both of these gears 110 and 111 are mounted on a sleeve 112 carried by a splined shaft 14, and having a pair of spaced flanges on its outer surface adapted to receive one end of a fork 115 that is pivoted on a shaft 116, the other end of the fork 115 being biased to disengaged position by the pair of springs 120 and 121. The splined shaft 114 is driven by the driving gear 26, a constantly meshing pinion 124, shaft 125 and universal joint connections 126 and 127.

Thus, the shaft 114 constantly rotates, and its motion may be transferred to the arm 25b upon actuation of the clutch 31, which includes as elements thereof the bevel gears 110 and 111. This clutch 31b is actuated by electrical means that may be identical with those described in connection with FIGURE 8, and for that reason corresponding parts in FIGURES 8, 10, 16, 17, and 18 have identical reference numerals. In this case, however, the miniature switches 55 and 56, as shown in FIGURE 18, are mounted for movement with the circular plate 105, so that their corresponding actuating members may be moved by engagement with a fixed pin 130, to cause actuation of such switches and operation of the control circuits which include the coils 46 and 47 in FIGURE 16, and which control circuit is identical with the control circuit previously described in connection with FIGURE 10.

Thus, the operation of the arrangement shown in FIGURES 16, 17, and 18 is essentially the same as that described in detail in connection with FIGURES 6 to 10, inclusive, with the exceptions noted above.

Description of FIGURES 19 Through 22

A number of automobiles are now being provided at the factories with power operated booster means to decrease the manual effort required in steering. In general, these means are driven by fluid under pressure, provided by suitable means such as a pump. The fluid is applied to a double acting piston connected to the steering mechanism of the car so that the piston does the majority of the work in positioning the steerable wheels. Different forms of control are used to operate the valves that in turn control the admission of fluid into the cylinder, but the construction and operation of these valves and their control by the steering wheel is of no particular concern in the present invention, so long as the fundamental elements of a power operated piston or other suitable form of servo means is provided, connected to the steering mechanism.

Referring again to FIGURES 1 through 5, it is contemplated that the sequence to be followed with the present apparatus includes the positioning of the car to be parked in a location aligned with the forward car F and parallel thereto, as indicated by the car D in FIGURE 1. At the beginning of the parking sequence, the wheels will then be turned toward the right, as indicated in FIGURE 2, and the car D then driven in reverse to the position indicated in FIGURE 3, at which time the wheels are then turned to the left, as indicated in FIGURE 4, and the rearward movement of the car D then continues until the car is in the position indicated in FIGURE 5, at which time the parking operation has been completed.

In the form of device illustrated in FIGURES 19 through 22, the dirigible wheels 24 are each suitably mounted upon an axle held by a kingpin and provided with an arm 25c, all as previously described. A synchronizing or tie rod 72 extends between the arm 25c in well known manner, and an arm 71 is connected to a plunger rod 73 driven by a double acting piston within a hydraulic cylinder 76. In most cases, an auxiliary mechanical connection 70 is provided for mechanically connecting the steering wheel to the steering mechanism. These elements, it will be appreciated, have previously been described in connection with the description of the form of device shown in FIGURES 11 through 15, and these same elements are found in the well known power operated steering devices.

A source of fluid under pressure, such as that provided by a hydraulic pump 135, driven by suitable means (not shown), is usually provided to furnish the motive power for operating the power steering mechanism, and such a source normally has a pressure supply 136 and return connections 137.

From the pressure and return connections 136 and 137, respectively, connection is made through suitable conduits 140 and 141, respectively, to the usual power steering control apparatus (not shown), and from that apparatus, connection is made by conduits 142 and 143 and conduits 144 and 145 to the hydraulic cylinder 76.

It will be appreciated that the control produced by the usual power steering apparatus will be a modulating control, in which the wheels 24 may be turned any desired amount, between limits, in either small or large increments, and either rapidly or slowly. However, when our improved parking device is in operation, a modulating type control is not desired, but instead the wheels 24 are to be turned their maximum amount in one direction, and thereafter, immediately turned the maximum amount in the opposite direction. While it is possible to so control the pilot valve of the conventional power operated steering mechanism so that this particular type of operation results, we have found it preferable to provide an entirely separate control, and to disconnect or render inoperative the usual control while the parking operation is in progress.

One method of accomplishing this is indicated in FIGURE 19 where a pair of transfer valves 150 and 151, operated by suitable electrical means such as a solenoid 152, are placed in the hydraulic circuit between the conduits 142 and 144, and 143 and 145, respectively. Under normal conditions, when the solenoid 152 is not energized, the hydraulic circuit extends from conduit 143 through valve 151, and then through conduit 145 to the cylinder. However, upon energization of the solenoid 152, the cylinder 76 and the conduits 144 and 145 are no longer connected to conduits 142 and 143, respectively, but instead are connected to conduits 154 and 155, respectively. The other ends of conduits 154 and 155 terminate at a two-position four-way valve 156 whose other connections 157 and 158 are connected to the pressure and return connection 136 and 137, respectively, of the pressure source 135. The two-position four-way valve 156 is normally held, as by spring or other suitable means, in one position, but is operable by means of a solenoid or other suitable operating means, to an opposite position. Thus, the valve 156 may be so constructed that normally pressure will flow from connection 157, through the valve 156, and into conduit 155, while the return is from conduit 154, through the valve 156, and then through connection 158. However, under these conditions, when the valve 156 is operated, pressure will flow from connection 157, through the valve, and into conduit 154, while the return will be from conduit 155, through the valve 156, and then through connection 158.

Assuming the various connections to be as indicated, when the solenoid 152 is operated and the transfer valves 150 and 151 establish connection between conduits 144 and 154, and between conduits 145 and 155, respectively, when the valve 156 is in its normal position, fluid under pressure will flow into the hydraulic cylinder 76 and operate the piston within the latter to turn the wheels 24 in the extreme righthand direction. However, when the valve 156 is operated to effect a change in the fluid-pressure relationship, the piston within the hydraulic cylinder 76 will be moved to the other limiting position, and the wheels 24 will be turned in the extreme lefthand direction. Because the pilot valves 150 and 151 have effectively disconnected the usual steering control system, no damage results to this system, and there is no unrelieved hydraulic pressure to be overcome.

To control the operation of the solenoid 152 and the two-way four-position valve 156, an electrical switching system is used to energize the various elements in the proper sequence. It will be realized, of course, that the parking sequence heretofore described requires the turning of the wheels only when the car is traveling backwards, or is about to do so. Consequently, as a safety precaution, we prefer to connect our control circuit through a switch 160 that is closed only when the car shift lever is in reverse. Such switches are presently used to operate so-called "back-up" lights, and are well known. As indicated in FIGURE 19, a source of electrical power, such as a storage battery 161, has one terminal grounded, and the other terminal is connected through a switch 160 to a conductor 162 that leads to a sequence control device 163. Within the sequence control device 163 is a pair of switches 185, 186, one of which is closed immediately when a button 176 or other operator is pressed to initiate the control cycle. This first switch 185 controls the operation of the solenoid 152 that in turn actuates the transfer valves 150 and 151, and a second switch within the sequence control device is later closed to operate the two-position four-way valve 156.

As indicated in FIGURE 20, the sequence control device 163 is constructed along lines similar to the parking indicator shown in our co-pending application Serial No. 255,576, now Patent Number 2,736,015, previously mentioned. Thus, a flexible cable 164 may be connected to the customary speedometer cable 165 by interposing a take-off 166 between the speedometer cable and the speedometer 167. The other end of the flexible shaft 164 is connected to a shaft 170 rotatably supported within a housing 171 of the sequence control device 163, and a clutch plate 172 is mounted upon the end of the shaft. Normally spaced from the clutch plate 172 but co-axial therewith is a driven clutch plate 173 mounted on a shaft 174 that is supported by suitable bearing means 175 within the housing. The shaft 174 continues beyond the bearing member 175, and projects outwardly through the case to form a push-button 176. A plate 177 is anchored to the shaft 174 for movement therewith at all times. A centering and return spring 180 is connected to the driven clutch plate 173 or some suitable member attached to the shaft 174 so that the shaft is normally indexed to a predetermined position, and moves away from the shaft 170, thereby separating the clutch plates 172 and 173. However, when the push-button 176 is pressed inwardly, a segmental collar 181 on shaft 174 engages a resiliently mounted plunger 182 to hold the shaft 174 in its inner position, and the clutch plates 172 and 173 are then in engagement. Thereafter, as the car moves, the flexible shaft 164 will turn the shaft 170, and the clutch plates 172 and 173 will transmit this motion to the shaft 174, rotating the latter. However, the flange 181 extends for only a portion of the circumference of the shaft 174, and as soon as this segment moves beyond the resiliently mounted plunger 182, the shaft 174 and the driven clutch plate 173 will be moved outwardly, under the influence of the spring 180 which will also index the shaft to its original position.

The plate 177, as indicated in FIGURE 21, may be generally circular with an outwardly extending projection 184. Mounted within the housing 171 are a pair of miniature snap-acting switches 185 and 186, these switches being so positioned that the operating member of switch 185 is engaged by the circular portion of the plate 177, while the operating member of switch 186 is engaged only by the projection 184. Thus, whenever the button 176 is pressed inwardly, the circular portion of plate 177 operates switch 185 to close the latter, and this switch remains closed all the time that the button remains in. Switch 185 is thus connected to the solenoid 152 that operates the transfer valves 150 and 151, and switch 186, which is closed only when the car has proceeded a predetermined distance rearwardly, is connected to the two-position four-way valve 156 to operate the latter.

To park a car having the form of parking device shown in FIGURES 19 through 22, the car is first placed in the position indicated in FIGURE 1, and the car then placed in reverse gear, and the button 176 then pressed inwardly. Placing the car in reverse gear has closed switch 160, and pressing the button 176 inwardly has caused the plate 177 to close switch 185, thereby energizing solenoid 152 and disconnecting the normal steering control system, so that fluid under pressure is now delivered to the hydraulic cylinder 176 through the two-position four-way valve 156. It will be remembered that the normal position of the two-position four-way valve is such as to cause the piston within the cylinder 76 to turn the wheels 24 to their extreme right position, and this now occurs, so that the condition of FIGURE 2 is now reached. As the car moves backwardly, plate 177 is rotated until such time as the car reaches the position indicated in FIGURE 3, at which time the projection 184 on the plate 177 engages the operating member of switch 186, whereupon the two-position four-way valve 156 is caused to move to its opposite position, thereby reversing the pressure to the cylinder 76 and consequently reversing the position of the wheels 24 so that the latter assume the position shown in FIGURE 4. Thereafter, the rearward motion of the car is continued until the position indicated in FIGURE 5 is achieved, at which time the collar 181 is disengaged from the resilient plunger 182 and the shaft 174 and plate 177 return to their original positions, opening switches 185 and 186, and restoring the normal power steering system to control.

In each of the various forms of the parking device herein shown and described, it will be noted that one of the principal characteristics of the apparatus is its ability to measure the distance traveled by the car being parked, as by counting revolutions, and fractions thereof, of one of more of the ground-engaging wheels of the car. The mechanical result of this measurement is then used to operate a control means such as a solenoid, etc., calling for the movement of the dirigible wheels in a predetermined sequence.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. Apparatus for accomplishing automatically a predetermined maneuver of an automotive vehicle comprising dirigible means, said apparatus including a power source, steering means operatively connected mediate said dirigible means and said power source, means incorporated in said steering means for operably connecting said power source to said dirigible means through said steering means, and self-dependent control means carried in its entirety by the vehicle and operably associated with said steering means to govern the same, said control means through its construction providing a pattern determining the displacement of said dirigible means necessary to accomplish the maneuver.

2. Apparatus for automatically parking an automotive vehicle having at least one dirigible wheel and including: power means including a rotatable element the angular displacement of which is proportional to vehicle displacement; steering means interconnected with the dirigible wheel and actuable to turn the wheel to steer the vehicle; actuating means incorporated in the steering means and including a first gear movable to effect the selective turning of the dirigible wheel; and self-dependent control means carried in its entirety by the vehicle and including a second gear connected to the rotatable element to be driven thereby proportionally to vehicle displacement, the control means being operatively connectible to the actuating means to cause the actuating means to turn the dirigible wheel in one direction and thereafter, upon predetermined displacement of the vehicle, to turn the dirigible wheel in the opposite direction.

3. Apparatus for automatically parking an automotive vehicle having at least one dirigible wheel and including: power means including a rotatable element the angular displacement of which is proportional to vehicle displacement; steering means interconnected with the dirigible wheel and actuable to turn the wheel to steer the vehicle; actuating means including an arcuate member having a central slot with arcuate rack sections on opposite sides of the slot; the actuating means being incorporated in the steering means and movable therewith to effect the selective turning of the wheel in either of two respectively opposite directions; pinion means connected to the rotatable element to be driven thereby and located in the slot of the arcuate member, normally disengaged from both of the rack sections, but selectively movable into engagement with either of the rack sections to drive the arcuate member; and self-dependent electrical control means carried in its entirety by the vehicle and including a switch connected to the arcuate member and actuated by the pinion means, the control means being effective to move the pinion means into one of the racks to turn the dirigible wheel in one direction and, thereafter, upon predetermined displacement of the vehicle to disengage the pinion means from said one of the racks and to engage the other of the racks to turn the dirigible wheel in the opposite direction.

4. Apparatus for automatically parking an automotive vehicle having at least one dirigible wheel and including: power means including a rotatable element the angular displacement of which is proportional to vehicle displacement; steering means interconnected with the dirigible wheel and actuable to turn the wheel to steer the vehicle; actuating means including a ring gear and linkage means driven thereby, the linkage means comprising a slotted arm and a stud extending into the slot for rotating the arm, the arm being incorporated in the steering means and movable therewith to effect the selective turning of the wheel in either of two respectively opposite directions; pinion means connected to the rotatable element to be driven thereby, and being located for movement across the face of said ring gear for selective engagement therewith on opposite sides thereof for driving the ring gear and the linkage means; and self-dependent electric control means carried in its entirety by the vehicle and including a switch connected to the actuating means and operated upon the rotation of the ring gear, the control means being effective to move the pinion means into engagement with one side of the ring gear to turn the dirigible wheel in one direction and, thereafter, upon a predetermined movement of the vehicle, to disengage the pinion means from the one side of the ring gear and to engage the other side thereof to turn the dirigible wheel in the opposite direction.

5. Apparatus for automatically parking an automotive vehicle having at least one dirigible wheel and including: a rotatable member the angular displacement of which is proportional to vehicle displacement; steering means interconnected with the dirigible wheel and actuable to turn the wheel to steer the vehicle; a source of high pressure fluid; actuating means including a fluid motor of the double-acting piston-and-cylinder type, the motor being incorporated in the steering means and operatively connected therewith to turn the dirigible wheel in either of two respectively opposite directions; self-dependent control means carried in its entirety by the vehicle and comprising a valve assembly including a rotatable control element effective to regulate the flow of fluid therethrough, the valve assembly being interconnected between the source and the fluid motor and operable, upon the rotation of the control element, to admit fluid under pressure into the motor for selective operation thereof; and means operable to connect the rotatable member to the valve assembly for rotation of the control element; the control element being biased so that upon connection thereof to the rotatable member the fluid motor turns the dirigible wheel in one direction and thereafter, upon predetermined displacement of the vehicle, the fluid motor turns the dirigible wheel in the opposite direction.

6. Apparatus for accomplishing automatically a predetermined maneuver of an automotive vehicle having at least one dirigible wheel and including: steering means connected to the dirigible wheel and operable to turn the wheel to steer the vehicle; a source of power connectible to operate the steering means; actuating means incorporated in the steering means and operatively connected between the power source and the dirigible wheel through the steering means to selectively turn the wheel in either of two respectively opposite directions; self-dependent control means carried in its entirety by the vehicle and operatively interconnected with the actuating means, the control means through its construction providing a pattern wherein the dirigible wheel is first turned in one direction and, upon predetermined displacement of the vehicle, the wheel is turned in the opposite direction.

References Cited in the file of this patent
UNITED STATES PATENTS

| | | |
|---|---|---|
| 1,570,547 | Avera | Jan. 19, 1926 |
| 2,424,288 | Severy | July 22, 1947 |
| 2,674,331 | Ovshinsky | Apr. 6, 1954 |
| 2,674,332 | Ovshinsky | Apr. 6, 1954 |
| 2,736,015 | Gilvarry et al. | Feb. 21, 1956 |
| 2,906,355 | Hirsch | Sept. 29, 1959 |